US011858653B2

(12) United States Patent
Cabos et al.

(10) Patent No.: US 11,858,653 B2
(45) Date of Patent: *Jan. 2, 2024

(54) FOREIGN OBJECT DETECTION FOR PASSENGER-ACCESSIBLE STOWAGE COMPARTMENTS

(71) Applicant: The Boeing Company, Chicago, IL (US)

(72) Inventors: Ralf Rene Cabos, Hainburg (DE); Nils Kneuper, Gravenbruch (DE); Jennifer Mayer, Hasselroth (DE)

(73) Assignee: The Boeing Company, Arlington, VA (US)

( * ) Notice: Subject to any disclaimer, the term of this patent is extended or adjusted under 35 U.S.C. 154(b) by 140 days.

This patent is subject to a terminal disclaimer.

(21) Appl. No.: 17/443,360

(22) Filed: Jul. 26, 2021

(65) Prior Publication Data

US 2021/0347495 A1    Nov. 11, 2021

Related U.S. Application Data

(63) Continuation of application No. 16/735,480, filed on Jan. 6, 2020, now Pat. No. 11,072,436.

(51) Int. Cl.
*B64D 45/00* (2006.01)
*B64D 47/02* (2006.01)
(Continued)

(52) U.S. Cl.
CPC ............ *B64D 45/00* (2013.01); *B64D 11/003* (2013.01); *B64D 11/0015* (2013.01);
(Continued)

(58) Field of Classification Search
CPC .. B64D 45/00; B64D 11/0015; B64D 11/003; B64D 11/0636; B64D 47/02; B64D 2045/009; G06V 20/52; H04L 67/12
See application file for complete search history.

(56) References Cited

U.S. PATENT DOCUMENTS

2013/0194089 A1\* 8/2013 Estrada ................... G08B 21/22
340/584
2017/0283086 A1\* 10/2017 Garing ............... B64D 45/0051
(Continued)

FOREIGN PATENT DOCUMENTS

JP        2014083858 A  \*  5/2014
WO   WO-2018077467 A1 \*  5/2018 ............. B60N 2/002

*Primary Examiner* — Quan Zhen Wang
*Assistant Examiner* — Rajsheed O Black-Childress
(74) *Attorney, Agent, or Firm* — Alleman Hall Creasman & Tuttle LLP

(57) ABSTRACT

Systems and methods relating to foreign object detection with respect to passenger-accessible stowage compartments are provided. According to one example, sensor data is captured via a sensor subsystem that includes a sensor associated with each of a plurality of stowage compartments. For each of the stowage compartments, a baseline condition is identified in which foreign objects are absent from the stowage compartment. A foreign object is detected within a stowage compartment based on the sensor data received for the stowage compartment and the baseline condition identified for the stowage compartment. An audit of the stowage compartments is conducted, and based on the audit, an indication that the foreign object is detected within the stowage compartment is output. This indication may identify the stowage compartment containing the foreign object among the plurality of stowage compartments.

20 Claims, 9 Drawing Sheets

(51) Int. Cl.
*B64D 11/00* (2006.01)
*B64D 11/06* (2006.01)
*H04L 67/12* (2022.01)
*G06V 20/52* (2022.01)

(52) U.S. Cl.
CPC .......... *B64D 11/0636* (2014.12); *B64D 47/02* (2013.01); *G06V 20/52* (2022.01); *H04L 67/12* (2013.01); *B64D 2045/009* (2013.01)

(56) References Cited

U.S. PATENT DOCUMENTS

| | | |
|---|---|---|
| 2018/0257784 A1 | 9/2018 | Simms et al. |
| 2018/0261026 A1 | 9/2018 | Simms et al. |
| 2019/0318164 A1 | 10/2019 | Kumar et al. |
| 2020/0047639 A1* | 2/2020 | Schevardo ............. B60N 2/002 |
| 2021/0016894 A1 | 1/2021 | Childress |
| 2021/0088394 A1* | 3/2021 | Oswald .................. G06Q 50/28 |
| 2022/0065631 A1* | 3/2022 | Lee ....................... G01C 21/206 |

\* cited by examiner

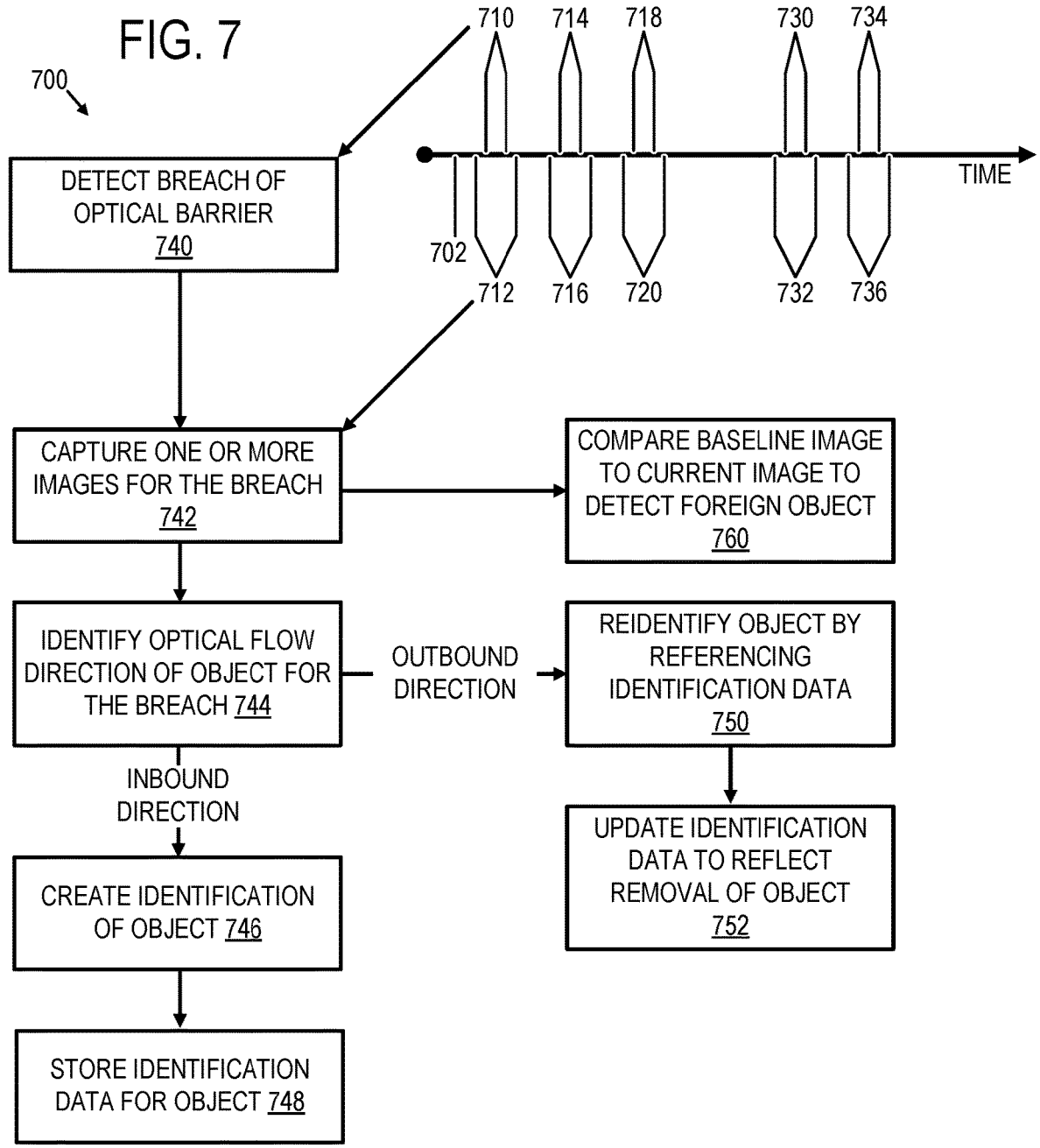

| SEAT ID | SEATBACK POCKET ID | SEATBACK POCKET SENSOR DATA | FOREIGN OBJECT CONDITION ID | OTHER OPERATING CONDITIONS | ... | OVERHEAD BIN ID | OVERHEAD BIN SENSOR DATA | FOREIGN OBJECT CONDITION ID | OTHER OPERATING CONDITIONS |
|---|---|---|---|---|---|---|---|---|---|
| 1A | SBP1 | A, B, C, D | 0 | 0 | | OHB1 | E, F, G, H | 0 | 0 |
| 1B | SBP2 | A, B, C, D | 0 | 0 | | OHB1 | E, F, G, H | 0 | 0 |
| 1C | SBP3 | A, B, C, D | 0 | 0 | | OHB1 | E, F, G, H | 0 | 0 |
| 2A | SBP4 | A, B, C, D | 0 | 0 | | OHB1 | E, F, G, H | 0 | 0 |
| 2B | SBP5 | A, B, C, D | 0 | 0 | | OHB1 | E, F, G, H | 0 | 0 |
| 2C | SBP6 | A, B, C, D | 0 | 0 | | OHB2 | E, F, G, H | 0 | 0 |
| 3A | SBP7 | A, B, C, D | 0 | 0 | | OHB2 | E, F, G, H | 0 | 0 |
| 3B | SBP8 | A, B, C, D | 0 | 0 | | OHB2 | E, F, G, H | 0 | 0 |
| 3C | SBP9 | | | | | | | | |
| ... | | | | | | | | | |
| N | SBPN | A, B, C, D | 0 | 0 | | OHB1 | E, F, G, H | 0 | 0 |

FIG. 8

FOREIGN OBJECT DETECTION FOR PASSENGER-ACCESSIBLE STOWAGE COMPARTMENTS

CROSS REFERENCE TO RELATED APPLICATIONS

This application is a continuation of U.S. patent application Ser. No. 16/735,480, filed Jan. 6, 2020, the entirety of which is hereby incorporated herein by reference for all purposes.

FIELD

An invention of the present disclosure relates generally to detecting the presence of foreign objects within passenger-accessible stowage compartments.

BACKGROUND

Passenger aircraft typically include passenger-accessible stowage compartments in the form of overhead bins and seatback pockets for passengers to store their personal belongings during a flight. Passengers may exit the aircraft at the conclusion of the flight and unintentionally leave their personal belongings in a stowage compartment on-board the aircraft. Between flights, service personnel may be tasked with checking stowage compartments for passenger belongings or to determine whether service items need to be restocked, such as magazines, menus, blankets, pillows, bottled water, etc.

SUMMARY

Systems and methods relating to foreign object detection with respect to passenger-accessible stowage compartments are disclosed. According to one example, sensor data is captured via a sensor subsystem that includes a sensor associated with each of a plurality of stowage compartments. For each of the stowage compartments, a baseline condition is identified in which foreign objects are absent from the stowage compartment. A foreign object is detected within the stowage compartment based on the sensor data received for the stowage compartment and the baseline condition identified for the stowage compartment. An audit of the stowage compartments is conducted, and based on the audit, an indication that the foreign object is detected within the stowage compartment is output. This indication may identify the stowage compartment containing the foreign object among the plurality of stowage compartments.

BRIEF DESCRIPTION OF THE DRAWINGS

FIG. 7 depicts an example timeline and flow diagram in which operations of the method of FIG. 5 are performed with respect to an overhead bin.

FIG. 8 depicts a table describing an example data association that may be maintained for a detection system.

DETAILED DESCRIPTION

Figure 1:
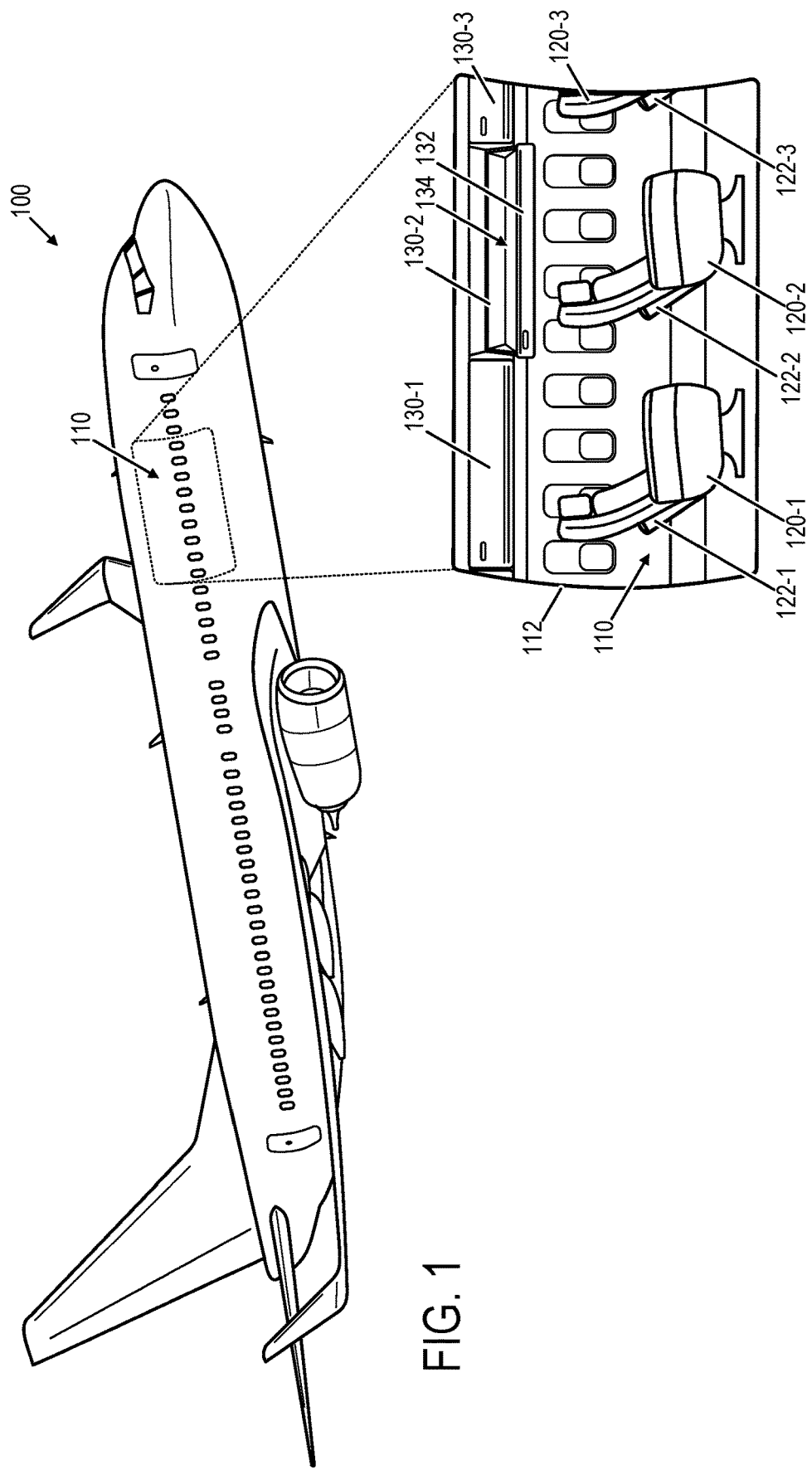
FIG. 1 depicts an example passenger vehicle in the form of a passenger aircraft.

Sensor-based detection of foreign objects stowed within passenger-accessible stowage compartments has the potential to reduce the occurrence of passengers unintentionally abandoning their personal belongings at the conclusion of service and may also reduce the burden on service personnel inspecting the stowage compartments between service events. In accordance with one example of the present disclosure, sensor data is captured via a sensor subsystem that includes at least one sensor associated with each of a plurality of stowage compartments. A foreign object is detected within a stowage compartment based on the sensor data received for the stowage compartment and a baseline condition identified for the stowage compartment. An audit of the stowage compartments may be conducted, and based on the audit, an indication that the foreign object is detected within the stowage compartment may be output. This indication may identify the stowage compartment containing the foreign object among the plurality of stowage compartments, and may be directed to service personnel or to a passenger associated with a particular seat. Additional conditions may be detected via stowage compartment sensors, including the removal of service objects from stowage compartment, fire or smoke conditions, and fatigue of components. By outputting an indication of these conditions, passengers may be reminded at an appropriate time that their belongings remain within a stowage compartment, and service personnel may need to check fewer stowage compartments, for example by attending only to those for which a condition has been detected.

There are several challenges associated with detecting foreign objects through the use of sensors. As one example, passenger belongings take a wide range of physical attributes, including size, shape, weight, density, rigidity, and compressibility. Illustrative examples of this range of passenger belongings include personal electronic devices, books and magazines, articles of clothing, wallets, luggage, and food and beverage items that may be consumed during service. Additional challenges associated with foreign object detection may be due to the differences in the shape, size, use, and construction of seatback pockets as compared to overhead bins. Seatback pockets typically provide a relatively narrow, yet expandable stowage region. Overhead bins, by contrast, typically feature a rigid construction and offer substantially greater storage capacity as compared to seatback pockets. Furthermore, overhead bins are typically shared by multiple passengers, whereas seatback pockets are typically used by an individual passenger. To address the above challenges, a sensor subsystem that includes different sensor configurations for overhead bins as compared to seatback pockets is provided. Additionally, sensor data received from multiple types of sensors per stowage compartment may be combined with sensor fusion to improve detection across a wide range of foreign objects.

FIG. 1 depicts an example passenger vehicle in the form of a passenger aircraft 100. A portion 112 of a passenger cabin 110 of passenger aircraft 100 is shown in further detail in FIG. 1. It will be understood that passenger aircraft 100 is merely one example of a passenger aircraft, and that a passenger aircraft may take various forms. Furthermore, while foreign object detection is discussed with respect to stowage compartments located on-board a passenger aircraft, it will be understood that the systems and methods disclosed herein may be incorporated with or used with respect to other types of passenger vehicles, including trains, buses, watercraft, spacecraft, etc.

Figure 9A:
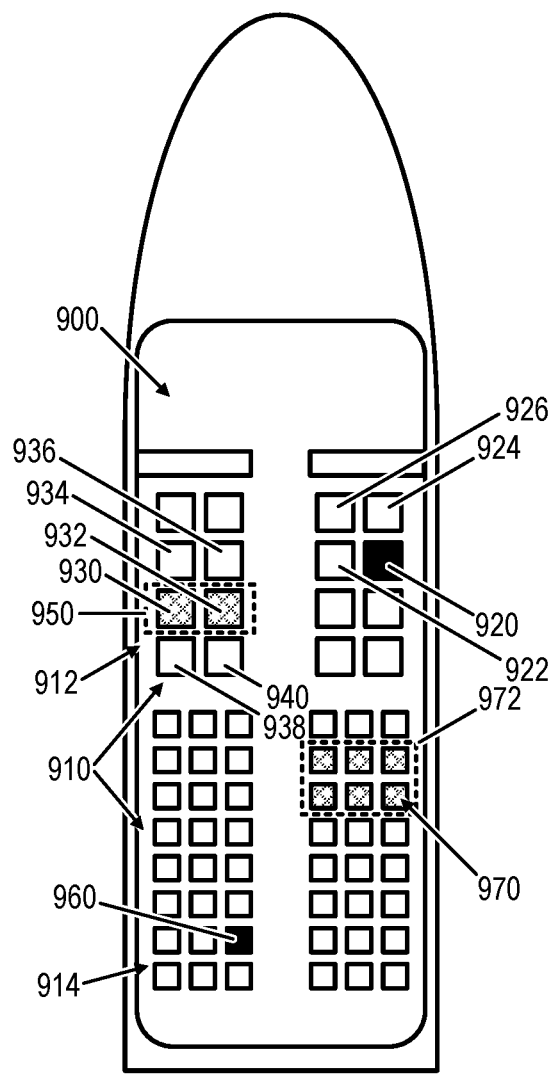
FIGS. 9A and 9B depict illustrations of an example passenger cabin.
Figure 9B:
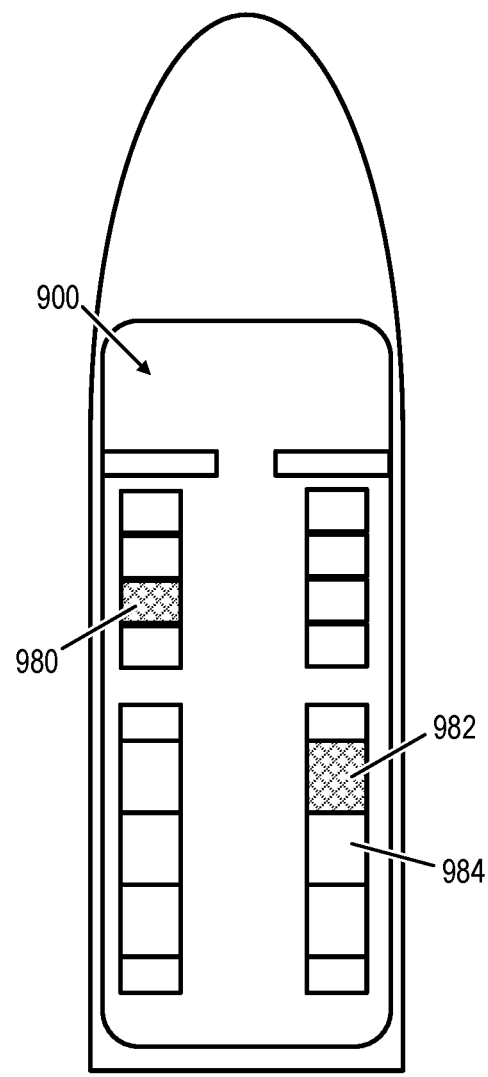

Passenger cabin 110 includes a plurality of passenger seats 120-1, 120-2, 120-3, etc. Depending on vehicle capacity, passenger cabin 110 may include several passenger seats, dozens of passenger seats, a hundred or more passenger seats, etc. Passenger seats of passenger cabin 110 may be arranged in rows in at least some examples, such as depicted in FIGS. 9A and 9B. Each passenger seat may include a seatback pocket, as depicted at 122-1 for passenger seat 120-1, 122-2 for passenger seat 120-2, and 122-3 for passenger seat 122-3, etc. For passenger seats facing a wall, a pocket similar to a seatback pocket may be mounted to the wall. These wall-mounted pockets may also be referred to herein as a seatback pocket for purposes of the present disclosure.

Passenger cabin 110 includes a plurality of overhead bins 130-1, 130-2, 130-3, etc. As described with reference to example overhead bin 130-2, each overhead bin may include a door 132 that opens to provide access to a stowage region 134 of the overhead bin. Door 132 may be closed to secure contents within the interior of the overhead bin during service. For example, overhead bin 130-2 is depicted in an open configuration, while overhead bins 130-1 and 130-3 are depicted in a closed configuration. While FIG. 1 depicts an example in which each row of passenger seats is associated with a respective overhead bin, in at least some examples an overhead bin may span two or more rows of passenger seats. Thus, two, four, six, or more passenger seats may reside beneath each overhead bin, depending on the configuration of the passenger cabin. Examples of overhead bin configurations are depicted in further detail with respect to FIGS. 9A and 9B.

Figure 2:
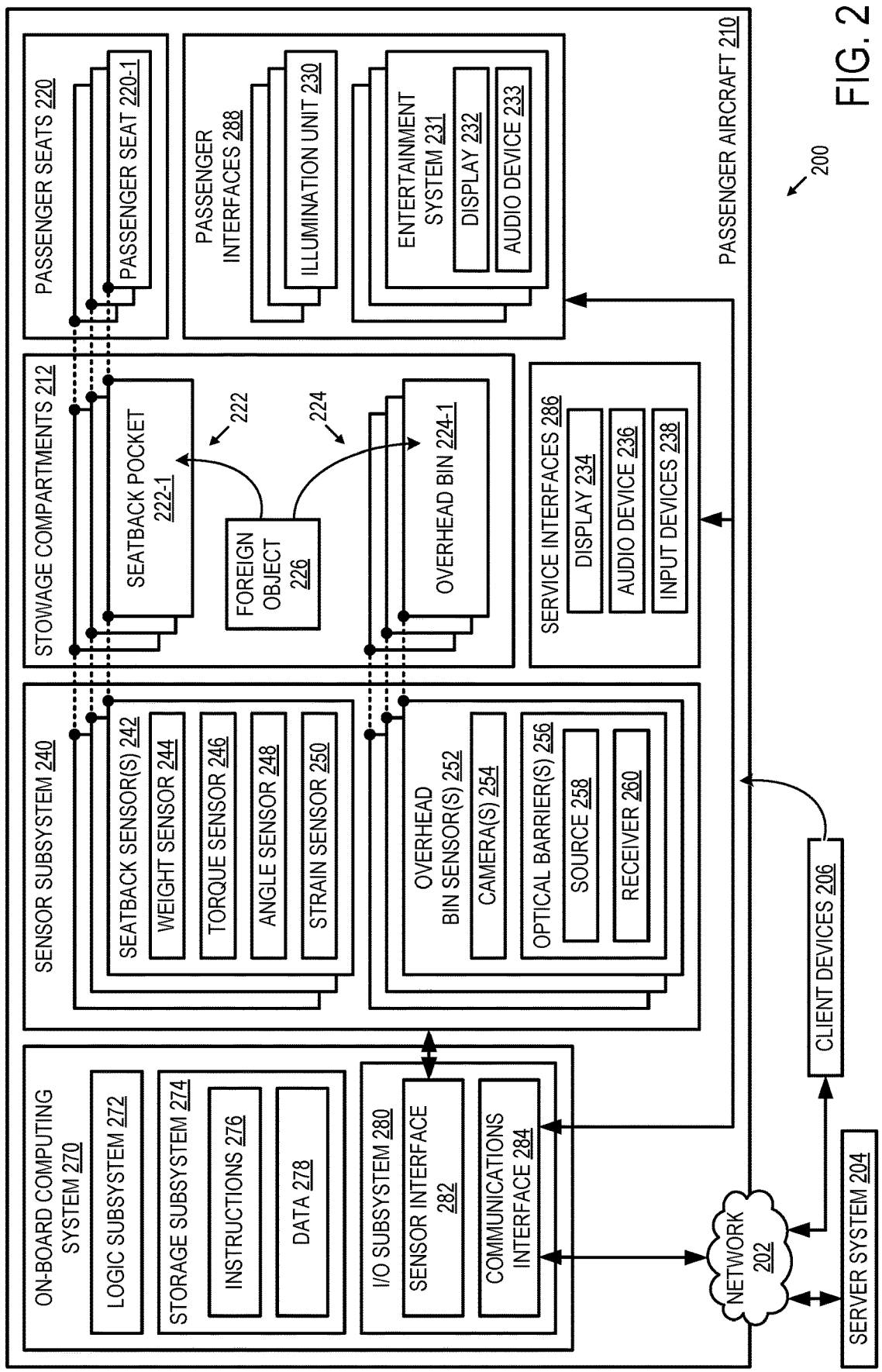
FIG. 2 depicts a schematic representation of an example detection system.

FIG. 2 depicts a schematic representation of an example detection system 200. In this example, detection system 200 is described within the context of a passenger aircraft 210. However, passenger aircraft 210 may take the form of other passenger vehicle types, including trains, buses, watercraft, spacecraft, etc. Passenger aircraft 100 of FIG. 1 is one example of passenger aircraft 210 depicted schematically in FIG. 2. Passenger aircraft 210 includes a plurality of passenger seats 220, an example of which includes passenger seat 220-1.

Passenger aircraft 210 includes a plurality of stowage compartments 212, including a plurality of seatback pockets 222, an example of which includes seatback pocket 222-1. The plurality of stowage compartments 212 further include a plurality of overhead bins 224, an example of which includes overhead bin 224-1. FIG. 2 schematically depicts a foreign object 226 (e.g., a personal belonging of a passenger) being placed within either of seatback pocket 222-1 or overhead bin 224-1.

Passenger aircraft 210 includes a sensor subsystem 240 that includes a set of one or more seatback pocket sensors 242 for each of the plurality of seatback pockets 222. As examples, the set of seatback pocket sensors 242 may include one or more of the following sensors: (1) a weight sensor 244 (e.g., a piezo-electric sensor, force transducer, or other suitable sensor type) that provides a measurement of a weight applied to the seatback pocket as a translational force by contents stored therein, (2) a torque sensor 246 (e.g., a piezo-electric sensor, force transducer, or other suitable sensor type) that provides a measurement of a torque applied to the seatback pocket as a rotational force by contents stored therein, (3) an angle sensor 248 that provides a measurement of an angle or a distance between an outer wall of the seatback pocket and a mounting surface (e.g., a seatback or a wall) to which the outer wall is mounted (e.g., via a potentiometer, piezo-electric sensor, Hall effect sensor, distance sensor, etc.) or a measurement of an angle of the outer wall of the seatback pocket relative to the gravity vector (e.g., via an accelerometer, inclinometer, inertial sensor, etc.), (4) a strain sensor 250 that provides a measurement of a strain within the outer wall of the seatback pocket. The particular set of seatback pocket sensors associated with each seatback pocket may include some or all of the above seatback pocket sensors to detect foreign objects of various shape, size, weight, density, rigidity, compressibility, or other physical attribute.

Figure 3A:
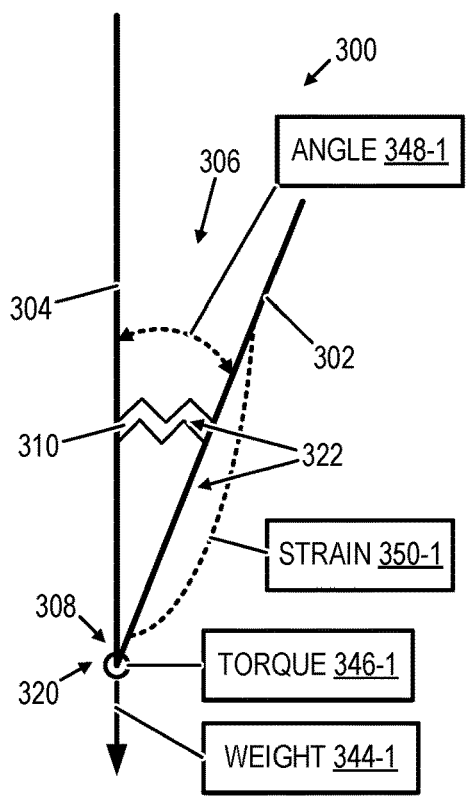
FIGS. 3A and 3B depict schematic representations of an example seatback pocket.
Figure 3B:
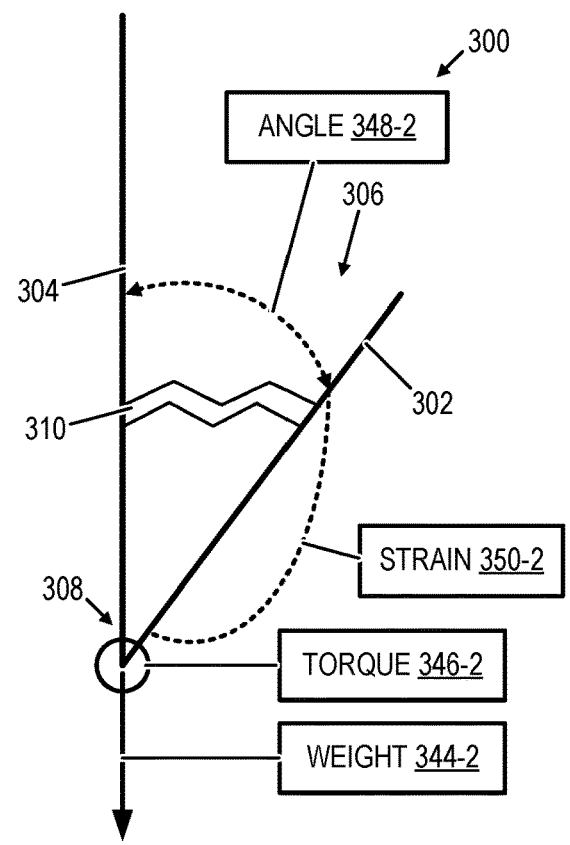

Referring also to FIGS. 3A and 3B, an example seatback pocket 300 is schematically depicted as being formed by an outer wall 302 and a mounting surface 304 (e.g., a seatback or a wall) that collectively defines a stowage region 306. Outer wall 302 may be mounted to mounting surface 304 along a lower edge 308 and/or opposing side portions 310 of the outer wall. In one example, outer wall 302 including opposing side portions 310 is formed of one or more textiles that permit the outer wall to flex and/or deform to accommodate objects within stowage region 306. In another example, outer wall 302 is formed at least partially by a rigid material, while opposing side portions 310 may be formed of a textile and/or a material having an accordion structure that permits the outer wall to expand and rotate about lower edge 308 as indicated by angle 348.

Weight sensor 244 of FIG. 2 provides a measurement of a weight 344-1 that is applied to seatback pocket 300 by objects located within stowage region 306. In an example, weight sensor 244 may be mounted at or near lower edge 308 as indicated at 320. Weight sensor 244 may include a first interface that is mounted to outer wall 302, a second interface that is mounted to mounting surface 304, and a sensing element that outputs sensor data representing a measurement of translational force between the first interface and the second interface.

Torque sensor 246 of FIG. 2 provides a measurement of a torque 346-1 is applied to seatback pocket 300 by objects located within stowage region 306. In an example, torque sensor 246 may be mounted at or near lower edge 308 as indicated at 320. Torque sensor 244 may include a first interface that is mounted to outer wall 302, a second interface that is mounted to mounting surface 304, and a sensing element that outputs sensor data representing a measurement of a rotational force between the first interface and the second interface.

Angle sensor 248 of FIG. 2 provides a measurement of the angle 348-1 between outer wall 302 and mounting surface 304 of seatback pocket 300. In an example, angle sensor 248 may be mounted at or near lower edge 308 as indicated at 320. Angle sensor 248 may include a first interface that is mounted to outer wall 302, a second interface that is mounted to mounting surface 304, and a sensing element that outputs sensor data representing a measurement of an angle of rotation between the first interface and the second interface.

Strain sensor 250 of FIG. 2 outputs sensor data representing a measurement of a strain 350-1 within outer wall 302 of seatback pocket 300. In at least some implementations, strain 350-1 may include strain measured within one or more of opposing side portions 310 of the outer wall. In an example, strain sensor 250 may be integrated with a textile that forms outer wall 302 and/or its opposing side portions 310.

Within FIG. 3B, seatback pocket 300 is schematically depicted with different measurements (e.g. increased measurements) of weight 344-2, torque 346-2, angle 348-2, and strain 350-2 as compared to FIG. 3A, which is the result of an object being placed within stowage region 306. According to one example, FIG. 3A depicts a baseline condition in which foreign objects are absent from stowage region 306, and FIG. 3B depicts an example in which one or more foreign objects are present within stowage region 306.

Referring again to FIG. 2, sensor subsystem 240 further includes a set of one or more overhead bin sensors 252 for each of the plurality of overhead bins 224. The set of overhead bin sensors 252 may include one or more optical sensors, including one or more cameras 254 and/or one or more optical barrier sensors 256. Each of optical barrier sensors 256 may include an electromagnetic radiation source 258 (e.g., visible light, infrared light, ultraviolet light, etc.) and an electromagnetic radiation receiver 260 between which an electromagnetic radiation path may be established that forms an optical barrier. Cameras 254 may include a visible light camera, an infrared light camera, a depth camera, etc. At least some of cameras 254 may incorporate a light source (e.g., in infrared and/or visible light spectrums) to illuminate a scene being optically imaged by the camera.

Figure 4:
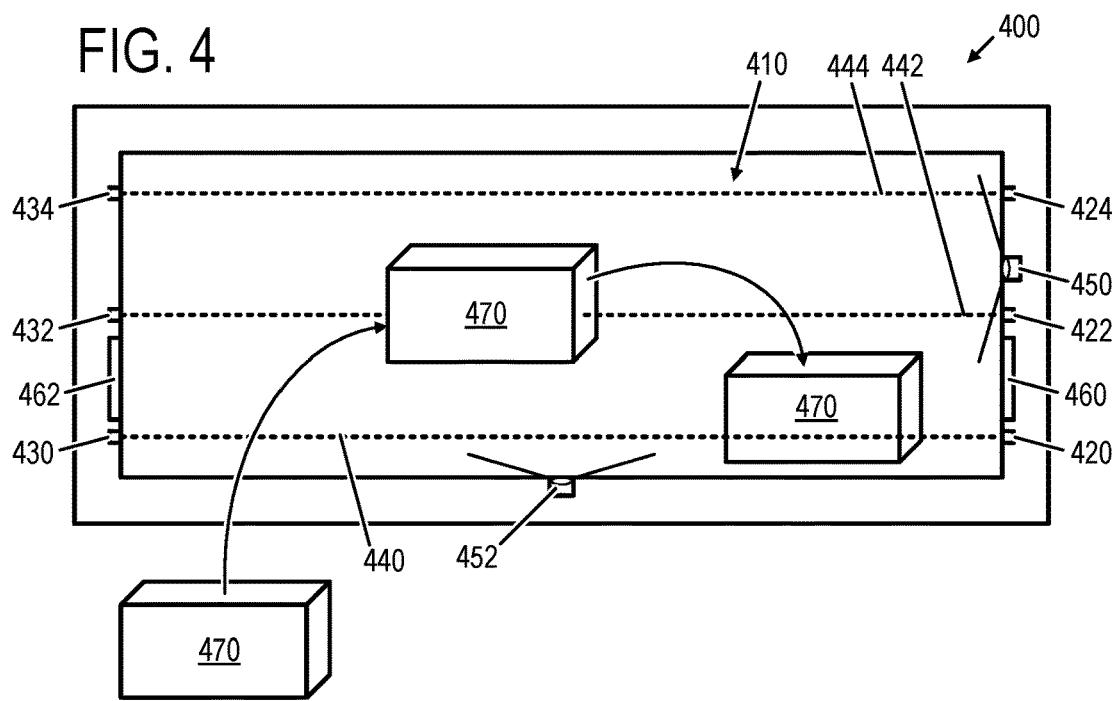
FIG. 4 depicts a schematic representation of an example overhead bin.

Referring also to FIG. 4, an example overhead bin 400 is depicted schematically in an opened configuration revealing a stowage region 410 of the overhead bin. FIG. 4 depicts an example configuration of overhead bin sensors 252 of FIG. 2. Optical barriers 440, 442, and 444 depicted in FIG. 4 are examples of electromagnetic optical barriers that may be provided by optical barrier sensors 256 of FIG. 2. FIG. 4 depicts optical barrier 442 being breached by a foreign object 470 as the object is moved from outside of the overhead bin to within stowage region 410.

In FIG. 4, optical barriers 440, 442, and 444 spanning stowage region 410 are provided by respective pairs of optical elements that includes an electromagnetic radiation source and receiver. The receiver of an optical barrier sensor outputs sensor data that varies responsive to a breach of the optical barrier by an object. As one example, optical elements 420, 422, and 424 include electromagnetic radiation sources, and optical elements 430, 432, and 434 include electromagnetic radiation receivers. As another example, optical elements 420, 422, and 424 include both an electromagnetic source and receiver, and optical elements 430, 432, and 434 may include mirror or other reflective surface. While FIG. 4 depicts an overhead bin including three optical barriers, it will be understood that overhead bins may include other suitable quantity of optical barriers, or that optical barrier sensor may be omitted in some implementations.

FIG. 4 further depicts overhead bin 400 including a camera 450 that images stowage region 410 and/or an entry region of the overhead bin in the vicinity of the door from an interior side wall of the bin. Alternatively or additionally, a camera 452 may be provided at an edge of the door frame or mounted on an interior of a door of the overhead bin at an orientation that enables the camera to image stowage region 410 from an exterior perspective looking into the bin. Cameras 450 and 452 are examples of previously described cameras 254 of FIG. 2. As multiple objects are often stored in overhead bins, some embodiments may include multiple cameras (e.g., 450 and/or 452) disposed relative to stowage region 410, for example to better assure that stored objects that may be blocked from the view of one or more cameras (e.g., by other stored objects) can be detected by one or more other cameras.

FIG. 4 further depicts an example in which display devices 460 and 462 are located within the overhead bin. A camera feed of the interior of the bin captured via one or more cameras (e.g., 450 or 452) may be displayed via display devices 460 and 462. This configuration may enable passengers or service personnel to easily check for low profile objects located on the floor of the overhead bin by viewing one of display devices. Display devices 460 and 462 are additional examples of passenger interfaces 288 or service personnel interfaces 286 of FIG. 2.

Referring again to FIG. 2, passenger aircraft 210 includes an on-board computing system 270 of one or more computing devices. Computing system 270 includes a logic subsystem 272 and a data storage subsystem 274 having instructions 276 stored thereon that are executable by the logic subsystem to perform one or more of the methods or operations disclosed herein. Data storage subsystem 274 may further include data 278 stored thereon, which may include sensor data received from sensor subsystem 240 and/or other forms of data.

Computing system 270 further includes an input/output subsystem 280 that includes a sensor interface 282 by which sensor data is received from sensor subsystem 240 and by which computing system 270 may operate or otherwise control sensor subsystem 240. Input/output subsystem 280 may further include a communications interface 284 by which on-board computing system 270 communicates with other system components, including service interfaces 286 and passenger interfaces 288.

In at least some implementations, computing system 270 may communicate over a communications network 202 with other computing devices or electronic components, such as a server system 204 and/or client devices 206. Communications network 290 may include a wired and/or wireless personal/local area network that provides network coverage on-board passenger aircraft 210. Communications network 290 may alternatively or additionally include a wireless wide area network by which on-board computing system 270 may communicate with terrestrial based wide area networks such as the Internet. Client devices 294 may reside on-board or off-board passenger aircraft 210, and may include personal computing devices carried by passengers and/or service personnel. Server system 292 may reside off-board passenger aircraft 210, and may include a plurality of terrestrial-based server computing devices that are geographically distributed.

Sensor interface 282 and communications interface 284 of input/output subsystem 280 may incorporate wired or wireless transceivers, amplifiers, filters, etc. configured to enable computing system 270 to send and receive data, issue control commands, and/or control electrical power supplied to the various components of detection system 200. Sensor interface 282 and communications interface 284 may support communications utilizing any suitable communications protocol or combination of protocols over wired and/or wireless links.

Passenger interfaces 288 may include a plurality of illumination units integrated with the aircraft of which illumination unit 230 is an example. Each illumination unit may be associated with a particular passenger seat or region of the passenger cabin. For example, an illumination unit may be provided on a ceiling or lower surface of an overhead bin of the aircraft for a group of seats located in a row. Computing system 270 may selectively illuminate a particular illumination unit to provide a visual indication to service personnel or passengers.

Passenger interfaces 288 may include a plurality of entertainment systems associated with respective passenger seats, an example of which is entertainment system 231. Each entertainment system may include a display device 232 and/or an audio interface or audio device 233 by which computing system 270 may output visual and/or audio data to passengers. An audio interface may include a physical audio connector to which a passenger may connect an audio device, such as headphones. An audio interface may additionally include a wireless interface by which audio data is transmitted for reception by client devices that are capable of outputting the audio data. Computing system 270 may selectively output a message via a particular display device and/or audio interface or audio device that is associated with a particular passenger seat of the aircraft. In at least some implementations, one or more display devices may be incorporated within overhead bins 224, and may provide a camera feed of the interior of the overhead bins that is captured via cameras 254.

Service interfaces 286 may include one or more display devices 234 and/or one or more audio interfaces or devices 236, as previously described with reference to entertainment system 231. Service interfaces 286 may be integrated with the aircraft for use by service personnel, and may be located at service stations distributed throughout the aircraft. Alternatively or additionally, service interfaces may take the form of mobile client devices carried by service personnel, such as previously described with reference to client devices 206. Service interfaces 286 may include one or more input devices 238, by which service personnel may provide user input to computing system 270. Input devices 238 may include touch screens, keyboards or keypads, a pointing device such as a mouse, handheld controller, etc., inertial sensors, optical sensors, and/or human voice interfaces supported by a microphone.

Figure 5:
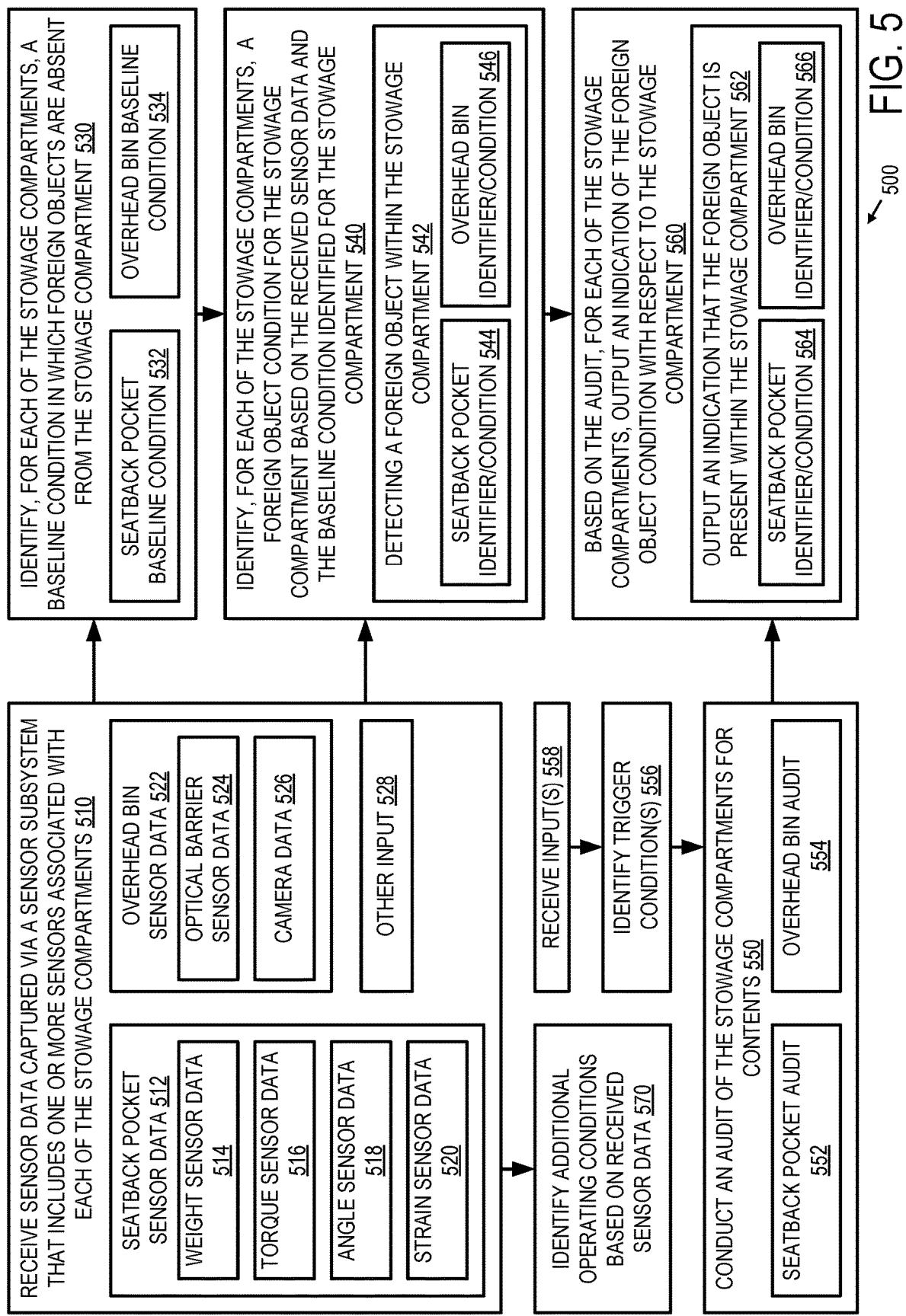
FIG. 5 is a flow diagram depicting an example method for detecting a foreign object within a stowage compartment.

FIG. 5 is a flow diagram depicting an example method 500. Method 500 may be performed by a computing system with respect to a passenger cabin that includes a plurality of stowage compartments. For example, method 500 may be performed by on-board computing system 270 of FIG. 2, or by a computing system that includes on-board computing system 270 in combination with one or more other computing devices or computing systems, such as server system 204 and/or client devices 206 of FIG. 2.

At 510, the method includes receiving sensor data captured via a sensor subsystem that includes a sensor associated with each of a plurality of stowage compartments. Within the context of seatback pockets, the sensor data received at 510 may include seatback pocket sensor data 512 for each seatback pocket. Seatback pocket sensor data may include one or more of weight sensor data 514, torque sensor data 516, angle sensor data 518, and/or strain sensor data 520. Within the context of overhead bins, the sensor data received at 510 may include overhead bin sensor data for each overhead bin. Overhead bin sensor data may include one or more of optical barrier sensor data 524 and/or camera data 526 (e.g., representing static images and/or video). Sensor data received at 510 may include other input 528, which may include sensor input from additional sensors located on-board the aircraft and/or user input received via a user input device or interface.

At 530, the method includes identifying, for each of the plurality of stowage compartments, a baseline condition in which foreign objects are absent from the stowage compartment. For example, a seatback pocket baseline condition 532 may be identified for each seatback pocket, and an overhead bin baseline condition 534 may be identified for each overhead bin. The baseline condition identified at 530 for a particular stowage compartment may be based on sensor data captured at 510 at a particular time by the one or more sensors associated with the stowage compartment. For example, sensor data received from each sensor may be stored as baseline measured values within a data storage subsystem of the on-board computing system or other computing system. The seatback pocket baseline condition 532 may be identified for some or all of the seatback pockets at the same time or at a different time that the overhead bin baseline condition 534 is identified for some or all of the overhead bins.

In at least some implementations, the baseline condition is identified responsive to receiving a user input via a service personnel interface or responsive to a sensor input from a sensor located on-board the aircraft (e.g., as other input 528). As one example, service personnel may provide a user input to the computing system via a service personnel interface to identify the baseline condition for some or all stowage compartments of the aircraft at a particular time, such as before boarding of passengers onto the aircraft. However, in another example, sensor input can be received from other sensors located on-board the aircraft responsive to which the baseline condition is identified without necessarily relying on human input. In situations where service objects, such as blankets, beverages, menus, magazines, etc. are to be included in stowage compartments, the baseline condition may be identified at 530 with those service objects already stowed within the stowage compartments, thereby incorporating those service objects into the identified baseline condition.

At 540, the method includes, for each of the plurality of stowage compartments, identifying a foreign object condition for the stowage compartment based on the sensor data received for the stowage compartment and the baseline condition identified for the stowage compartment. A foreign object condition may include an empty condition in which foreign objects are absent from the stowage compartment or a present condition in which one or more foreign objects are present within the stowage compartment.

At 542, for example, a foreign object is detected within the stowage compartment at a time after the baseline condition is identified at 530. As one example, sensor data may be continuously received from one or more sensors associated with the stowage compartment and compared to the baseline condition to determine a measured deviation from the baseline condition. The measured deviation may be compared to a threshold for the one or more types of sensors. Each sensor type or combination of sensor types may be associated with a different threshold. If the measured deviation from the baseline condition exceeds the threshold, the foreign object condition for the stowage compartment may be identified as the present condition, indicating that a foreign object is within the stowage compartment. However, if the measured deviation does not exceed the threshold, the foreign object condition may be identified as the empty condition, indicating that foreign objects are absent from the stowage compartment.

For configurations in which multiple sensors are associated with the stowage compartment, a combination of sensor data received from the multiple sensors may be compared to the same combination of sensor data received from the multiple sensors at a time that the baseline condition was identified to identify the foreign object condition for the stowage compartment. A sensor-specific weighting may be applied to sensor data received from a particular sensor type within a combination of sensor data received from multiple sensor types. As one example, seatback angle sensor data may be weighted less than seatback weight, torque, or strain sensor data within the combination of sensor data.

In at least some implementations, a seatback pocket identifier and an associated foreign object condition may be identified for each seatback pocket at 544, and an overhead bin identifier and an associated foreign object condition may be identified for each overhead bin at 546. The use of identifiers of stowage compartments is described in further detail with reference to FIGS. 8 and 9.

At 550, the method includes conducting an audit of the plurality of stowage compartments for contents. A seatback pocket audit 552 and an overhead bin audit 554 may be conducted in parallel or independent of each other responsive to a trigger condition or different trigger conditions identified at 556 for each type of stowage compartment. Identifying one or more trigger conditions at 556 may be based on one or more inputs received at 558, which may include sensor input received at 510 or other suitable input. As one example, service personnel may provide a user input via a service personnel interface to conduct the audit at 550. As another example, the audit conducted at 550 may be in response to sensor input received from a sensor associated with an exterior door of the aircraft indicating that the door has been opened at the conclusion of service. As yet another example, the audit conducted at 550 may be in response to a threshold quantity of overhead bin doors (e.g., a majority) being opened following a service event in which the overhead bin doors were closed, as may be detected by observed changes in lighting conditions via one or more overhead bin sensors.

At 560, the method includes, for each of the plurality of stowage compartments, outputting the foreign object condition with respect to the stowage compartment based on the audit conducted or otherwise responsive to initiating the audit at 550. In one example, outputting the foreign object condition includes outputting an indication that the foreign object is present within the stowage compartment. Alternatively or additionally, outputting the foreign object condition includes outputting an indication of an absence of foreign objects within the stowage compartment. In at least some implementations, the seatback pocket identifier and the foreign object condition may be identified for each seatback pocket at 564, and the overhead bin identifier and the foreign object condition may be identified for each overhead bin at 566.

As one example, outputting the indication that the foreign object is present within the stowage compartment includes outputting a visual indication via a display device or an illumination unit integrated with the aircraft. For configurations in which the display device or the illumination unit is one of a plurality of available output devices integrated with the aircraft, the method may include selecting the display device or the illumination unit from among the plurality of available output devices based on the identified stowage compartment. For example, a database stored within a data storage subsystem on-board the aircraft or within a remotely located server system may associate each passenger seat with a particular illumination unit and/or display device that can be referenced by the computing system.

As another example, outputting the indication that the foreign object is present within the stowage compartment includes transmitting an electronic message identifying the stowage compartment to a target recipient address over a communications network. In this example, the method may further include identifying the target recipient address from a database stored on-board the aircraft or at a remotely located server system that associates the target recipient address with the stowage compartment for aircraft operations occurring between identifying the baseline condition for the stowage compartment and conducting the audit. The target recipient address may correspond to an email address, phone number, or other service identifier of a passenger or service personnel.

At 570, the method may include detecting one or more additional operating conditions based on sensor data received at 510. As one example, the method at 570 further includes detecting a fire or smoke condition within one of the plurality of overhead bins via an optical sensor associated with the overhead bin, and outputting an indication of the fire or smoke condition via an output device (e.g., a display device or audio device, etc.). Optical sensors of an overhead bin may be used to detect the presence of fire based on illuminance of image pixels exceeding a threshold and/or exhibiting a particular color within a predetermined range, as examples. The presence of smoke may be detected via an optical barrier sensor based on its sensor data exhibiting a predefined breach pattern or partial breach pattern indicative of smoke occlusion, as an example. Predefined values for identifying the presence of fire and/or smoke may be stored within a data storage subsystem on-board the aircraft.

As another example, the method at 570 includes aggregating the seatback pocket sensor data (e.g., strain sensor data and/or other sensor data) received over time to obtain an aggregate value for each of the plurality of seatback pockets. An aggregate fatigue condition may be detected for one of the plurality of seatback pockets based on the aggregate value for the seatback pocket, and an indication of the aggregate fatigue condition for the seatback pocket may be output that identifies the seatback pocket among the plurality of seatback pockets. For example, the aggregate fatigue value may be compared to a threshold to determine whether a seatback pocket is to be replaced or repaired.

As yet another example, an operating condition indicating that a service object has been removed from the stowage compartment may be detected based on the audit conducted at 550. Within the context of seatback pockets, measured values of weight, torque, angle, and/or strain that are less than their baseline values indicate that the service object has been removed from the stowage compartment. In this case, an indication may be output via a service personnel interface or client device identifying the seatback pocket among the plurality of seatback pockets, enabling service personnel to attend to replacement of service objects.

Figure 6A:
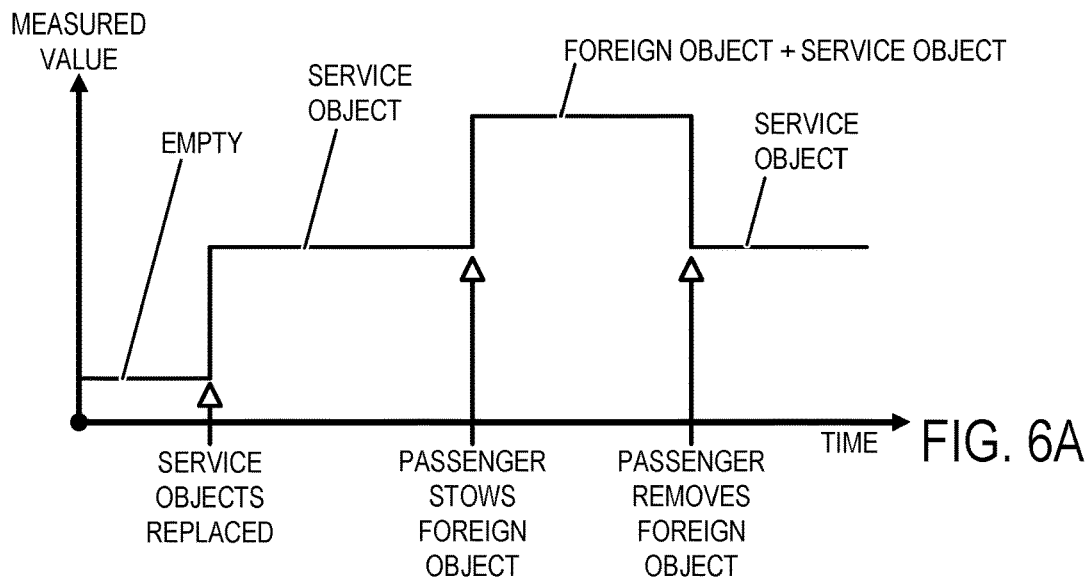
FIGS. 6A, 6B, and 6C depict example timelines in which operations of the method of FIG. 5 are performed with respect to a seatback pocket.
Figure 6B:
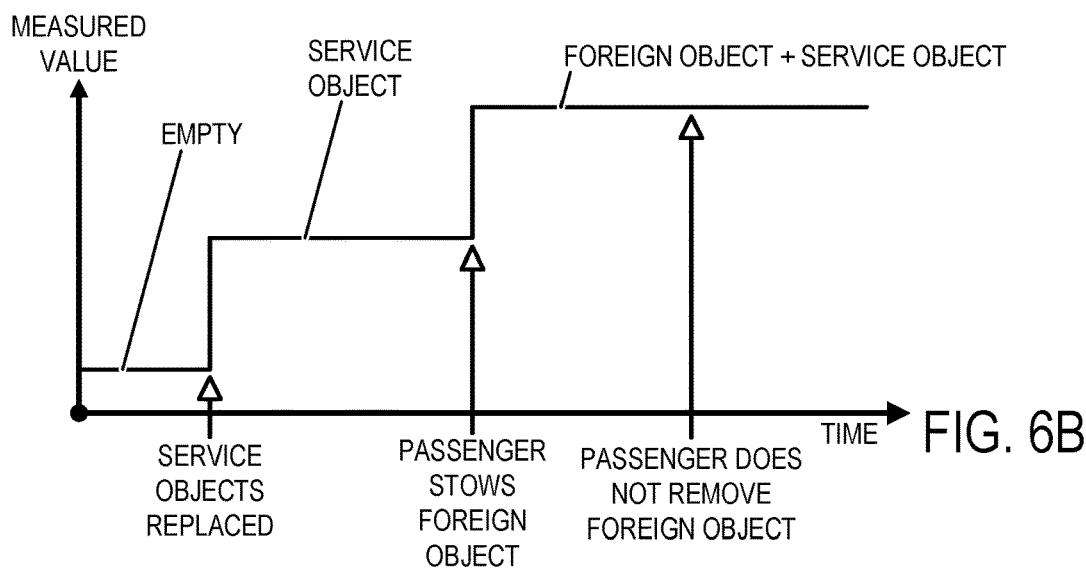
Figure 6C:
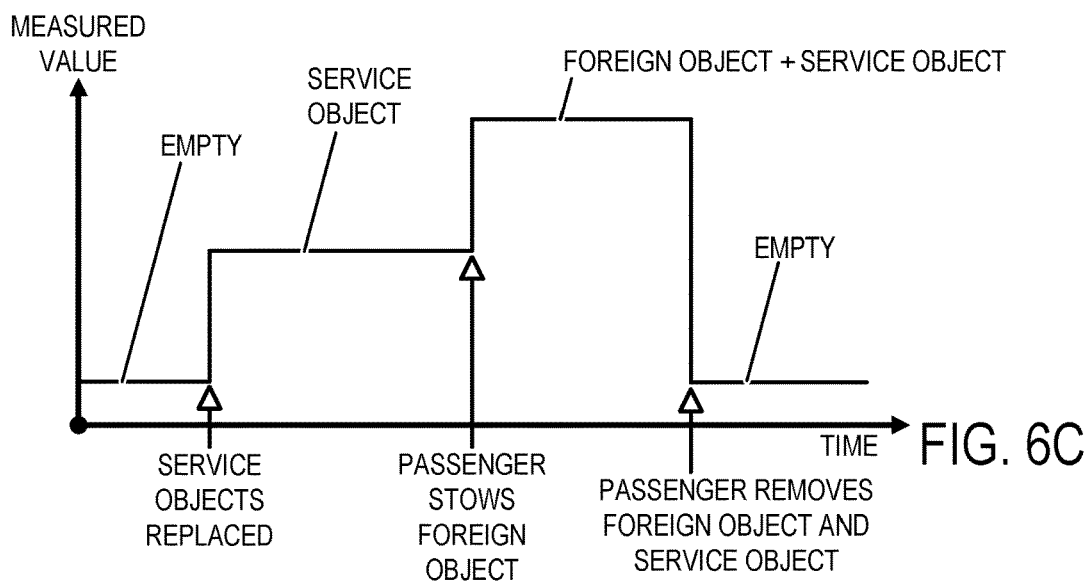

FIGS. 6A, 6B, and 6C depict example timelines in which operations of method 500 of FIG. 5 are performed with respect to a seatback pocket. In each of the example timelines, the horizontal axis represents the time dimension and the vertical axis represents a measured value received from a seatback pocket sensor, which may include one or more of a weight, torque, angle, and/or strain sensor as previously described with reference to FIGS. 2, 3A, and 3B.

In FIG. 6A, a service object (e.g., a complimentary item such as a magazine) is stowed within an initially empty seatback pocket by service personnel as part of a replacement operation performed prior to passengers boarding the aircraft. Upon adding the service object to the seatback pocket, the measured value received from the sensor increases, reflecting an increase in the measured weight, torque, angle, and/or strain. As previously described with reference to operation 530 of FIG. 5, the baseline condition may be identified following the replacement of service objects, but prior to boarding of the aircraft by passengers. In this manner, presence of the service object within the seatback pocket is incorporated in the measured value for the baseline condition. Next, a passenger stows a foreign object in the seatback pocket, which further increases the measured value, reflecting a further increase in the measured weight, torque, angle, and/or strain. At the conclusion of service, the passenger removes the foreign object from the seatback pocket and deboards the aircraft, resulting in a decrease in the measured value to approximately the baseline condition. An audit conducted following the removal of the foreign object may be used to identify a foreign object condition in which foreign objects are absent from the seatback pocket.

In FIG. 6B, the passenger instead deboards the aircraft without removing the foreign object or the service object from the seatback pocket. An audit conducted following the deboarding of the passenger may be used to identify a foreign object condition in which the foreign object is detected as being present within the seatback pocket.

In FIG. 6C, the passenger instead deboards the aircraft after removing both the foreign object and the service object from the seatback pocket. An audit conducted following removal of the foreign object and service object may be used to identify a foreign object condition in which the foreign object is not present and the additional operating condition that the service object is not present in the seatback pocket. By conducting an audit following deboarding of the aircraft by passengers, seatback pockets that retain their service objects may be distinguished from seatback pockets no longer containing service objects, thereby enabling service personnel to more quickly and easily replace service objects within the appropriate seatback pockets.

FIG. 7 depicts an example timeline and flow diagram 700 in which operations of method 500 of FIG. 5 are performed with respect to an overhead bin. Referring to the timeline, an optical barrier provided by an optical barrier sensor associated with an overhead bin is breached as indicated by breach event 710. Referring to the flow diagram, breach event 710 is detected at 740 upon receiving sensor data from the optical barrier sensor. Breaches of the optical barriers may be used by the computing system to identify time periods in which images or video captured via cameras associated with the overhead bin are to be analyzed for foreign objects. However, optical barriers may be omitted in at least some implementations.

At 742, one or more images are captured by a camera associated with the overhead bin within a period of time 712 corresponding to the breach event at 710. The camera may be positioned to optically image the interior and/or entrance region of the overhead bin containing the optical barrier. In an example, the camera may continuously capture a video feed in which a timing of breach event 710 is used to identify images within the video feed that correspond in time with the breach. In FIG. 7, the period of time 712 is depicted as beginning before breach event 710 and ending after the breach event, which provides an example in which images captured before and/or after the breach may be identified in addition to images captured during the breach event. In at least some implementations, the continuous video feed may be stored in a circular buffer configured to store a predefined duration of video for the overhead bin within a storage subsystem of the aircraft from which images may be retrieved and analyzed. In another example, the camera may be operated to capture one or more images in response to the breach event, without capturing a continuous video feed.

At 744, an optical flow direction is identified for breach event 710 based on the one or more images captured at 742. Computer vision techniques may be applied to the one or more images captured at 742 to determine the optical flow direction of an object responsible for the breach event as either traveling into the overhead bin (i.e., inbound direction) or traveling out of the overhead bin (i.e., outbound direction). Within an individual image, a direction of blur associated with movement of the object within the image frame may be used to determine the optical flow direction. Additionally or alternatively, comparing a change in position of similar features of the object (e.g., one or more pixels) within two or more images of a time-series of images may be used to determine the optical flow direction.

For the inbound direction, an identification of the object may be created at 746 by associating identification data with an object identifier. The identification data may include raw and/or segmented image frames containing the object or portions of the object. The identification data may additionally or alternatively include a set of one or more features of the object that were extracted from the image frames using a feature extraction algorithm. Such features may include or be indicative of a color, shape, size, or other suitable feature of the object. The identification data for the object may be stored at 748 along with the object identifier. A counter representing a quantity of objects within the overhead bin may be incremented to indicate that the object was added to the overhead bin.

Referring again to the timeline, additional breach events occurring at 714, 718, 730, and 734 may be detected at 740, and additional images captured by the camera may be identified over periods of time 716, 720, 730, and 734, respectively, that correspond to those breach events. In this example, breach events 710, 714, and 718 have an optical flow direction determined to be in the inbound direction, such as at the time of boarding of the aircraft. Therefore, following breach event 718, identification data is created and stored for three objects that were added to the overhead bin along with respective object identifiers, and the counter representing the quantity of objects within the bin has been incremented to indicate that three objects are within the overhead bin.

Subsequent breach events 730 and 734, in this example, have an optical flow direction determined to be in the outbound direction, such as at the time of deboarding of the aircraft. For the outbound direction, each object may be reidentified by referencing the identification data previously created and stored for the inbound objects. As an example, object recognition algorithms may be applied to image frames captured during period of time 732 and 736 corresponding to the outbound breach events using the identification data previously created and stored for the inbound breach events to identify which objects have been removed from the overhead bin.

At 752, the identification data is updated to reflect the removal of the identified objects from the overhead bin, and the counter is decremented to reflect the removal of the identified objects. For example, following breach events 730 and 734, the counter indicates that one object remains in the overhead bin. Current images of the remaining object and/or previously stored images of that object that were captured during the inbound breach may be output to one or more display devices, enabling passengers or service personnel to identify and retrieve the object from the overhead bin. The display device may be located within the overhead bin or may form part of an on-board entertainment system of a passenger seat associated with the overhead bin, a service interface, a client device of service personnel, or a client device of a passenger associated with the overhead bin based on seat assignment.

In at least some implementations, optical detection of foreign objects using cameras may be performed without the use of optical barriers. As one example, the one or more cameras associated with each overhead bin may be used to identify whether foreign objects are present within the overhead bin by comparing, at 760, a current image of the interior of the overhead bin with a baseline image of the interior of the overhead bin that was captured at 702 as part of identifying the baseline condition at operation 530 of FIG. 5. This comparison may be performed on a pixel by pixel basis of spatially aligned pixels extracted from each of the image frames being compared. As one example, a foreign object may be detected within the overhead bin upon identifying a threshold quantity of pixels grouped within a region of the image that exhibit a threshold difference in a pixel value from the spatially aligned pixels of the baseline image.

Changes in lighting conditions between a baseline image and a subsequent image may be accounted for by normalizing the images with respect to red, green, and blue pixel values. The one or more cameras associated with each overhead bin may include an infrared camera that incorporates an infrared light source for illumination of the imaged scene, thereby reducing or eliminating variations in lighting conditions between baseline and subsequent images due to changes in lighting conditions within the visible spectrum.

The one or more cameras associated with each overhead bin may include a depth camera that measures a depth of objects within the imaged environment on a per pixel basis. A foreign object may be identified within the overhead bin by comparing the depth values of the baseline image with the depth values of a current image on a pixel by pixel basis. A depth difference threshold may be applied to determine whether a pixel of the current image represents an object that is closer to the camera than the corresponding pixel in the baseline image. A foreign object may be detected upon a threshold quantity of pixels exhibiting the depth difference threshold within a region of the current image.

FIG. 8 depicts a table describing an example data association 800 that may be maintained for detection system 200 of FIG. 2. As one example, data association 800 may be maintained by computing system 270 creating, storing, updating, and referencing data association 800 within data 278 of FIG. 2. Alternatively or additionally, data association 800 may be maintained by a remotely located computing system or computing device, such as example server system 292 or client devices 294 of FIG. 2.

Data association 800 associates a seat identifier assigned to each passenger seat on-board the aircraft with one or more of: (1) a seatback pocket identifier assigned to each seatback pocket on-board the aircraft, (2) seatback pocket sensor data representing measurements obtained from one or more seatback pocket sensors associated with each seatback pocket, (3) a foreign object condition identifier for each seatback pocket, (4) other operating conditions identified for each seatback pocket (e.g., representing an aggregate fatigue condition), (5) an overhead bin identifier assigned to each overhead bin on-board the aircraft, (6) overhead bin sensor data representing measurements obtained from one or more overhead bin sensors associated with each overhead bin, (7) a foreign object condition identifier for each overhead bin, and (8) other operating conditions identified for each overhead bin (e.g., representing a fire or smoke condition). Sensor data of data association 800 may take the form of a time-series or stream of sensor data that is received over time from each sensor. Additional data fields may be included in data association 800, such as to include a baseline condition identified for each seatback pocket and for each overhead bin.

FIG. 9A depicts an illustration of an example passenger cabin 900 of an aircraft. In at least some implementations, graphical representations of passenger cabins, such as depicted in FIG. 9A, may be presented via a display device used by service personnel or passengers to output an indication that a foreign object is present within a stowage compartment of the aircraft, or that other operating condition is present. In this example, passenger seats 910 are arranged in rows on either side of a central walkway, and are divided into a premium seating section 912 and an economy seating section 914. However, it will be understood that other suitable seating configurations may be used.

In the example of FIG. 9A, seats or regions of the aircraft that are associated with stowage compartments within which a foreign object has been detected are presented in a manner that is visually distinguishable from seats or regions that are associated with stowage compartments within which foreign objects have not been detected. Visual indicators such as color, shape, size, patterning, highlighting, and/or labeling may be used to visually distinguish seats or regions of an aircraft from each other.

As one example, within seating section 912, a foreign object has been detected within a seatback pocket associated with seat 920, such as the seatback pocket mounted to the seatback of seat 924. In contrast to seat 920, foreign objects are not detected within seatback pockets associated with seats 922, 924, 926. Accordingly, seat 920 is presented in a manner that is visually distinguishable from surrounding seats 922, 924, 926, for example, by using a different color.

As another example, within seating section 912, a foreign object has been detected within an overhead bin associated with seats 930 and 932, such as the overhead bin residing directly above seats 930 and 932. In contrast to seats 930 and 932, foreign objects are not detected within overhead bins associated with seats 934, 936, 938, and 940. Accordingly, seats 930 and 932 are presented in a manner that is visually distinguishable from surrounding seats 934, 936, 938, and 940, for example, by using a different color and/or patterning. Seats 930 and 932 are also presented in a manner that is visually distinguishable from seat 920, thereby representing the type of stowage compartment within which a foreign object has been detected. Additionally, in this example, a region 950 is presented in a manner that is visually distinguishable from other regions of the aircraft. Region 950 represents the overhead bin within which the foreign object has been detected.

Within seating section 914, a foreign object has been detected within a seatback pocket associated with seat 960, and another foreign object has been detected within an overhead bin associated with a group of six seats 970. Accordingly, seat 960 and the group of six seats 970 are presented in a manner that graphical indicates that foreign objects have been detected within stowage compartments associated with these seats. Additionally, in this example, a region 972 is presented in a manner that is visually distinguishable from other regions of the aircraft. Region 972 represents an overhead bin within which the foreign object has been detected. In contrast to the overhead bin example of seating section 912 that is associated with two seats, the overhead bin of seating section 914 is instead associated with six seats.

FIG. 9B depicts another illustration of example passenger cabin 900. Similar to FIG. 9A, graphical representations of passenger cabins, such as depicted in FIG. 9B, may be presented via a display device. In the example of FIG. 9B, overhead bins are graphically represented in place of passenger seats. Previously described regions 950 and 972 of FIG. 9A representing overhead bins containing foreign objects are instead depicted in FIG. 9B as overhead bins 980 and 982, and are presented in a manner that is visually distinguishable from other overhead bins that do not contain foreign objects, such as overhead bin 984.

Figure 10A:
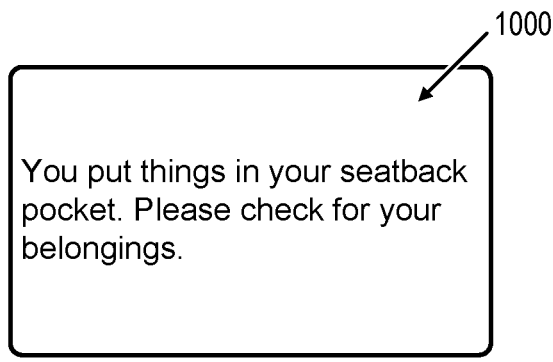
FIGS. 10A, 10B, 10C, and 10D depict example messages that may be output to provide an indication that a foreign object has been detected within a stowage compartment.

FIG. 10A depicts an example message 1000 that may be output to provide an indication to a passenger still located on-board an aircraft that a foreign object is currently present within a seatback pocket. In this example, message 1000 identifies the stowage compartment as a seatback pocket. Message 1000 may be output by displaying the message via a display device or by audibly reading the message as computer-generated speech via an audio interface of an integrated entertainment system associated with the passenger's seat or the passenger's personal electronic device.

Figure 10B:
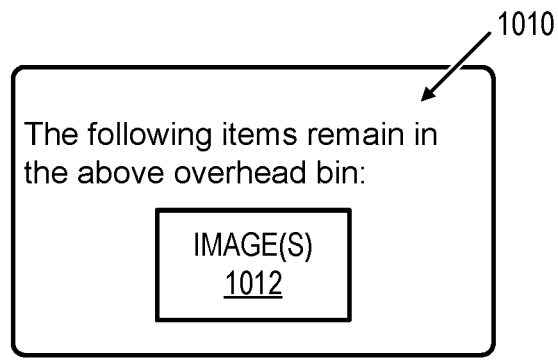

FIG. 10B depicts another example message 1010 that may be output to provide an indication to a passenger still located on-board an aircraft that a foreign object is currently present within an overhead bin. In this example, message 1010 identifies the stowage compartment as an overhead bin. Message 1010 may include one or more images 1012 that include a static image and/or video feed captured via a camera associated with the overhead bin. Message 1010 may be output by displaying the message including the one or more images 1012 via a display device or by audibly reading at least a portion of the message as computer-generated speech via an audio interface of an integrated entertainment system associated with the passenger's seat or the passenger's personal electronic device.

Figure 10C:
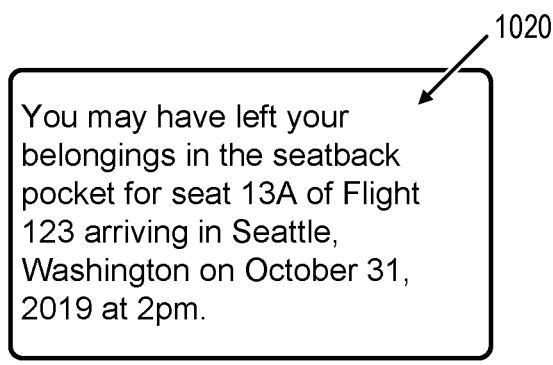

FIG. 10C depicts an example message 1020 that may be output to provide an indication that a foreign object was or is currently present within a stowage compartment of an aircraft following deboarding of passengers. Message 1000 identifies the type of stowage compartment (e.g., seatback pocket), a seat identifier (e.g., 13A), the flight (e.g., flight 123 arriving in the city of Seattle, Washington), and the date/time of the arrival (e.g., Oct. 31, 2019 at 2 pm).

Figure 10D:
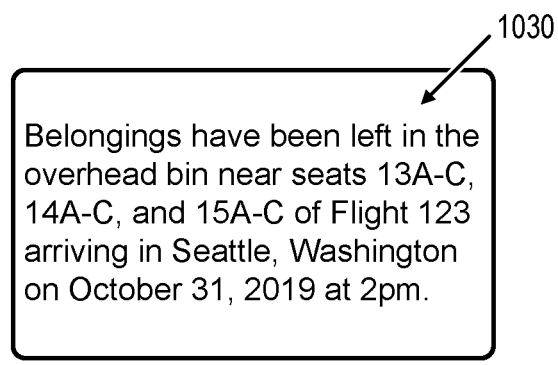

FIG. 10D depicts another example message 1030 that may be output to provide an indication that a foreign object was or is currently present within a stowage compartment of an aircraft following deboarding of passengers. Message 1030 identifies the type of stowage compartment (e.g., overhead bin), a seat identifier (e.g., 13A-C, 14A-C, and 15A-C), the flight (e.g., flight 123 arriving in the city of Seattle, Washington), and the date/time of the arrival (e.g., Oct. 31, 2019 at 2 pm). In at least some examples, message 1030 may additionally include the one or more images 1012 previously described with respect to FIG. 10B, thereby enabling the passenger to determine whether any of the objects belong to the passenger. Messages 1020 and 1030 may be output by displaying the message via a display device or by audibly reading the message as computer-generated speech via an audio interface of a client device, as examples.

In some at least some implementations, the methods and operations described herein may be tied to a computing system of one or more computing devices. In particular, such methods and processes may be implemented as a computer-application program or service, an application-programming interface (API), a library, and/or other computer-program product.

FIG. 2 schematically shows a non-limiting example of a computing system of one or more computing devices. For example, the computing system of FIG. 2 includes on-board computing system 270, server system 204, and client devices 206 as examples of devices that can enact one or more of the methods and operations described herein. The computing system of FIG. 2 may take the form of one or more personal computers, server computers, tablet computers, home-entertainment computers, network computing devices, gaming devices, mobile computing devices, mobile communication devices (e.g., smart phone), and/or other computing devices. While components of on-board computing system 270 are described in further detail below, it will be understood that server system 204, client devices 206, and other suitable computing devices also include a logic subsystem, a storage subsystem, an input/output subsystem, and other suitable components.

On-board computing system 270 is shown in FIG. 2 in simplified form. A logic subsystem, such as example logic subsystem 272 of on-board computing system 270, includes one or more physical devices configured to execute instructions. For example, the logic subsystem may be configured to execute instructions that are part of one or more applications, services, programs, routines, libraries, objects, components, data structures, or other logical constructs. Such instructions may be implemented to perform a task, implement a data type, transform the condition of one or more components, achieve a technical effect, or otherwise arrive at a desired result.

A logic subsystem, such as example logic subsystem 272, may include one or more processors configured to execute software instructions. Additionally or alternatively, the logic subsystem may include one or more hardware or firmware logic subsystems configured to execute hardware or firmware instructions. Processors of the logic subsystem may be single-core or multi-core, and the instructions executed thereon may be configured for sequential, parallel, and/or distributed processing. Individual components of the logic subsystem optionally may be distributed among two or more separate devices, which may be remotely located and/or configured for coordinated processing. Aspects of the logic subsystem may be virtualized and executed by remotely accessible, networked computing devices configured in a cloud-computing configuration.

A storage subsystem, such as example storage subsystem 274 of on-board computing system 270, includes one or more physical devices configured to hold instructions executable by the logic subsystem to implement the methods and operations described herein. When such methods and operations are implemented, the condition of the storage subsystem may be transformed—e.g., to hold different data. The storage subsystem may include removable and/or built-in devices. The storage subsystem may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. The storage subsystem may include volatile, nonvolatile, dynamic, static, read/write, read-only, random-access, sequential-access, location-addressable, file-addressable, and/or content-addressable devices. It will be appreciated that the storage subsystem includes one or more physical devices. However, aspects of the instructions described herein alternatively may be propagated by a communication medium (e.g., an electromagnetic signal, an optical signal, etc.) that is not held by a physical device for a finite duration.

Aspects of a logic subsystem and a storage subsystem of a computing device or computing system may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of the computing system implemented to perform a particular function. In some cases, a module, program, or engine may be instantiated via the logic subsystem executing instructions held by the storage subsystem. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

It will be appreciated that a "service" may be used to refer to an application program executable across multiple user sessions. A service may be available to one or more system components, programs, and/or other services. In some implementations, a service may run on one or more server-computing devices.

When included, a display device (e.g., 232, 234, etc.) may be used to present a visual representation of data held by the storage subsystem. This visual representation may take the form of a graphical user interface (GUI). As the herein described methods and operations change the data held by the storage subsystem, and thus transform the condition of the storage subsystem, the condition of the display device may likewise be transformed to visually represent changes in the underlying data. Display devices may be combined with the logic subsystem and/or the storage subsystem in a shared enclosure, or such display devices may be peripheral display devices.

An input/output subsystem, such as example input/output subsystem 280 of on-board computing system 270, may comprise or interface with one or more user-input devices such as a keyboard, mouse, touch screen, or handheld controller. In some examples, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition.

A communications interface, such as example communications interface 284 of on-board computing system 270, may be configured to communicatively couple the computing system with one or more other computing devices or computing systems. The communications interface may include wired and/or wireless communication devices compatible with one or more different communication protocols. The communications interface may be configured for communication via a wireless telephone network, or a wired or wireless local- or wide-area network, as examples. In some examples, the communications interface may allow the computing system to send and/or receive messages to and/or from other devices via a network such as the Internet.

Examples of the subject matter of the present disclosure are described in the following enumerated paragraphs.

A1. A method performed by a computing system with respect to an aircraft passenger cabin containing a plurality of stowage compartments, the method comprising: receiving sensor data captured via a sensor subsystem that includes a sensor associated with each of the plurality of stowage compartments; identifying, for each of the plurality of stowage compartments, a baseline condition in which foreign objects are absent from the stowage compartment; detecting a foreign object within a stowage compartment based on the received sensor data for the stowage compartment and the baseline condition identified for the stowage compartment; conducting an audit of the plurality of stowage compartments for contents; and based on the audit, outputting an indication that the foreign object is within the stowage compartment, the indication identifying the stowage compartment among the plurality of stowage compartments.

A2. The method of paragraph A1, wherein the plurality of stowage compartments include a plurality of overhead bins or a plurality of seatback pockets, and wherein: for the plurality of overhead bins, the one or more sensors associated with each of the plurality of overhead bins include an optical sensor, or for the plurality of seatback pockets, the one or more sensors associated with each of the plurality of seatback pockets include: a strain gauge that outputs an indication of strain within an outer wall of the seatback pocket opposite its seatback, or a force sensor that outputs an indication of a weight and/or a torque applied to the seatback pocket, or an angle sensor that outputs an indication of an angle between an outer wall of the seatback pocket and its seatback.

A3. The method of paragraph A2, wherein the plurality of stowage compartments include the plurality of overhead bins; and wherein the method further comprises: detecting a fire or smoke condition within one of the plurality of overhead bins via the optical sensor associated with the overhead bin; and outputting an indication of the fire or smoke condition.

A4. The method of paragraph A2, wherein the plurality of stowage compartments include the plurality of seatback pockets; and wherein the method further comprises: aggregating the sensor data received over time to obtain an aggregate value for each of the plurality of seatback pockets; detecting an aggregate fatigue condition for one of the plurality of seatback pockets based on the aggregate value for the seatback pocket; and outputting an indication of the aggregate fatigue condition for the seatback pocket that identifies the seatback pocket among the plurality of seatback pockets.

A5. The method of any of paragraphs A1-A4, further comprising: detecting a trigger condition; and responsive to the trigger condition, conducting the audit of the plurality of stowage compartments for contents.

A6. The method of paragraph A5, wherein the trigger condition is detected responsive to receiving a user input via a service personnel interface or responsive to a sensor input from a sensor located on-board the aircraft.

A7. The method of any of paragraphs A1-A6, wherein the baseline condition is detected responsive to receiving a user input via a service personnel interface or responsive to a sensor input from a sensor located on-board the aircraft.

A8. The method of any of paragraphs A1-A7, wherein outputting the indication that the foreign object is present within the stowage compartment includes outputting a visual indication via a display device or an illumination unit integrated with the aircraft.

A9. The method of paragraph A8, wherein the display device or the illumination unit is one of a plurality of available output devices integrated with the aircraft; and wherein the method further includes selecting the device or the illumination unit from among the plurality of available output devices based on the identified stowage compartment.

A10. The method of any of paragraphs A1-A9, wherein outputting the indication that the foreign object is present within the stowage compartment includes transmitting an electronic message identifying the stowage compartment to a target recipient address over a communications network; and wherein the method further comprises, identifying the target recipient address from a database that associates the target recipient address with the stowage compartment for aircraft operations occurring between identifying the baseline condition for the stowage compartment and conducting the audit.

A11. The method of any of paragraphs A1-A10, wherein the baseline condition for a stowage compartment includes baseline sensor data received via the one or more sensors associated with the stowage compartment; and wherein the foreign object is identified as being present within the stowage compartment based on a comparison of the baseline sensor data with the sensor data received from the sensor associated with the stowage compartment while the audit is conducted.

B1. A detection system for monitoring an aircraft passenger cabin containing a plurality of stowage compartments, the detection system comprising: a sensor subsystem including a sensor associated with each of the plurality of stowage compartments; a logic subsystem interfacing with the sensor subsystem; and a storage subsystem having instructions stored thereon executable by the logic subsystem to: receive sensor data captured via the sensor subsystem; identify, for each of the plurality of stowage compartments, a baseline condition in which foreign objects are absent from the stowage compartment; detect a foreign object within a stowage compartment based on the sensor data captured by the sensor associated with the stowage compartment and the baseline condition identified for the stowage compartment; conduct an audit of the plurality of stowage compartments for contents; and based on the audit, output an indication that the foreign object is within the stowage compartment, the indication identifying the stowage compartment among the plurality of stowage compartments.

B2. The detection system of paragraph B1, wherein the plurality of stowage compartments include a plurality of overhead bins or a plurality of seatback pockets, and wherein: for the plurality of overhead bins, the one or more sensors associated with each of the plurality of overhead bins include an optical sensor, or for the plurality of seatback pockets, the one or more sensors associated with each of the plurality of seatback pockets include: a strain gauge that outputs an indication of strain within an outer wall of the seatback pocket opposite its seatback, a force sensor that outputs an indication of a weight and/or a torque applied to the seatback pocket, or an angle sensor that outputs an indication of an angle between an outer wall of the seatback pocket and its seatback.

B3. The detection system of paragraph B2, wherein the plurality of stowage compartments include the plurality of overhead bins; and wherein the instructions are further executable by the logic subsystem to: detect a fire or smoke condition within one of the plurality of overhead bins via the optical sensor associated with the overhead bin; and output an indication of the fire or smoke condition.

B4. The detection system of paragraph B2, wherein the plurality of stowage compartments include the plurality of seatback pockets; and wherein the instructions are further executable by the logic subsystem to: aggregate the sensor data received over time to obtain an aggregate value for each of the plurality of seatback pockets; detect an aggregate fatigue condition for one of the plurality of seatback pockets based on the aggregate value for the seatback pocket; and output an indication of the aggregate fatigue condition for the seatback pocket that identifies the seatback pocket among the plurality of seatback pockets.

B5. The detection system of any of paragraphs B1-B4, wherein the indication that the foreign object is within the stowage compartment is output as a visual indication via a display device or an illumination unit integrated with the aircraft.

B6. The detection system of any of paragraphs B1-B5, wherein the indication that the foreign object is within the stowage compartment is output by transmitting, via a communications interface of the detection system, an electronic message identifying the stowage compartment to a target recipient address over a communications network; and wherein the instructions are further executable by the logic subsystem to identify the target recipient address from a database that associates the target recipient address with the stowage compartment for aircraft operations occurring between identification of the baseline condition for the stowage compartment and conducting the audit.

B7. The detection system of any of paragraphs B1-B6, wherein the baseline condition includes sensor data received via the one or more sensors associated with the stowage compartment in which foreign objects are absent from the stowage compartment; and wherein the foreign object is identified within the stowage compartment based on a comparison of the baseline sensor data received for the baseline condition to the sensor data received by the one or more sensors associated with the stowage compartment while the audit is conducted.

B8. The detection system of any of paragraphs B1-B7, wherein the baseline condition is identified at a first time responsive to receiving a first user input via a service personnel interface or responsive to a sensor input from a sensor located on-board the aircraft; and wherein the audit is conducted at a second time occurring after the first time responsive to receiving a second user input via a service personnel interface or responsive to a sensor input from a sensor located on-board the aircraft.

C1. A passenger aircraft, comprising: a passenger cabin that includes a plurality of passenger seats and a plurality of stowage compartments, the plurality of stowage compartments further including a plurality of overhead bins located above the plurality of passenger seats or a plurality of seatback pockets located upon the plurality of passenger seats; a sensor subsystem including a sensor associated with each of the plurality of stowage compartments; a computing system configured to: receive sensor data captured via the sensor subsystem; identify, for each of the plurality of stowage compartments, a baseline condition in which foreign objects are absent from the stowage compartment; detect a foreign object within a stowage compartment of the plurality of stowage compartments based on the sensor data associated with the stowage compartment and the baseline condition identified for the stowage compartment; and output an indication that the foreign object is present within the stowage compartment, the indication identifying the stowage compartment among the plurality of stowage compartments.

It will be understood that the configurations and/or approaches described herein are exemplary in nature, and that these specific embodiments or examples are not to be considered in a limiting sense, because numerous variations are possible. The specific methods described herein may represent one or more of any number of processing strategies. As such, various acts illustrated and/or described may be performed in the sequence illustrated and/or described, in other sequences, in parallel, or omitted. Likewise, the order of the above-described processes may be changed. The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A detection system for monitoring an aircraft passenger cabin containing a plurality of seatback pockets, the detection system comprising:
   a sensor subsystem including one or more sensors associated with each of the plurality of seatback pockets, wherein the one or more sensors associated with each seatback pocket of the plurality of seatback pockets includes a strain gauge integrated with a textile that forms an outer wall of the seatback pocket that outputs an indication of strain within the outer wall of the seatback pocket opposite its seatback;
   a logic subsystem interfacing with the sensor subsystem; and
   a storage subsystem having instructions stored thereon executable by the logic subsystem to:
      receive sensor data captured via the sensor subsystem;
      identify, for each of the plurality of seatback pockets, a baseline condition in which foreign objects are absent from the seatback pocket;
      detect a foreign object within a seatback pocket based on the sensor data captured by the one or more sensors associated with the seatback pocket and the baseline condition identified for the seatback pocket; and
      output an indication that the foreign object is within the seatback pocket, the indication identifying the seatback pocket among the plurality of seatback pockets.

2. The detection system of claim 1 wherein the instructions are further executable by the logic subsystem to:
   detect a trigger condition responsive to receiving a user input via a service personnel interface or a sensor input via a sensor located on-board the aircraft;
   responsive to the trigger condition, conduct an audit of the plurality of seatback pockets for contents; and
   wherein the indication that the foreign object is within the seatback pocket is output is based on the audit.

3. The detection system of claim 1, wherein the instructions are further executable by the logic subsystem to:
   aggregate the sensor data received over time to obtain an aggregate value for each of the plurality of seatback pockets;
   detect an aggregate fatigue condition for one of the plurality of seatback pockets based on the aggregate value for the seatback pocket; and
   output an indication of the aggregate fatigue condition that identifies the seatback pocket among the plurality of seatback pockets.

4. The detection system of claim 1, wherein the baseline condition includes sensor data received via the one or more sensors associated with the seatback pocket in which foreign objects are absent from the seatback pocket; and
   wherein the foreign object is identified within the seatback pocket based on a comparison of the baseline sensor data received for the baseline condition to the sensor data received by the one or more sensors associated with the seatback pocket.

5. The detection system of claim 1, wherein the indication that the foreign object is within the seatback pocket is output as a visual indication via a display device or an illumination unit integrated with the aircraft.

6. The detection system of claim 5, wherein the display device or the illumination unit is one of a plurality of available output devices integrated with the aircraft; and
   wherein the instructions are further executable by the logic subsystem to select the display device or the illumination unit from among the plurality of available output devices based on the identified seatback pocket.

7. The detection system of claim 1, wherein the indication that the foreign object is within the seatback pocket is output by transmitting an electronic message identifying the seatback pocket to a target recipient address over a communications network; and
   wherein the instructions are further executable by the logic subsystem to identify the target recipient address from a database that associates the target recipient address with the seatback pocket for aircraft operations occurring between identifying the baseline condition for the seatback pocket and detecting the foreign object.

8. A detection system for monitoring an aircraft passenger cabin containing a plurality of seatback pockets, the detection system comprising:
   a sensor subsystem including one or more sensors associated with each of the plurality of seatback pockets, wherein the one or more sensors associated with each seatback pocket of the plurality of seatback pockets includes a force sensor that outputs an indication of a torque applied to the seatback pocket between an outer wall of the seatback pocket and its seatback;
   a logic subsystem interfacing with the sensor subsystem; and
   a storage subsystem having instructions stored thereon executable by the logic subsystem to:
      receive sensor data captured via the sensor subsystem;
      identify, for each of the plurality of seatback pockets, a baseline condition in which foreign objects are absent from the seatback pocket;
      detect a foreign object within a seatback pocket based on the sensor data captured by the one or more sensors associated with the seatback pocket and the baseline condition identified for the seatback pocket; and
      output an indication that the foreign object is within the seatback pocket, the indication identifying the seatback pocket among the plurality of seatback pockets.

9. The detection system of claim 8, wherein the instructions are further executable by the logic subsystem to:
   detect a trigger condition responsive to receiving a user input via a service personnel interface or a sensor input via a sensor located on-board the aircraft;

responsive to the trigger condition, conduct an audit of the plurality of seatback pockets for contents; and wherein the indication that the foreign object is within the seatback pocket is output is based on the audit.

10. The detection system of claim 8, wherein the instructions are further executable by the logic subsystem to:

aggregate the sensor data received over time to obtain an aggregate value for each of the plurality of seatback pockets;

detect an aggregate fatigue condition for one of the plurality of seatback pockets based on the aggregate value for the seatback pocket; and output an indication of the aggregate fatigue condition that identifies the seatback pocket among the plurality of seatback pockets.

11. The detection system of claim 8, wherein the baseline condition includes sensor data received via the one or more sensors associated with the seatback pocket in which foreign objects are absent from the seatback pocket; and wherein the foreign object is identified within the seatback pocket based on a comparison of the baseline sensor data received for the baseline condition to the sensor data received by the one or more sensors associated with the seatback pocket.

12. The detection system of claim 8, wherein the indication that the foreign object is within the seatback pocket is output as a visual indication via a display device or an illumination unit integrated with the aircraft.

13. The detection system of claim 12, wherein the display device or the illumination unit is one of a plurality of available output devices integrated with the aircraft; and wherein the instructions are further executable by the logic subsystem to select the display device or the illumination unit from among the plurality of available output devices based on the identified seatback pocket.

14. The detection system of claim 8, wherein the indication that the foreign object is within the seatback pocket is output by transmitting an electronic message identifying the seatback pocket to a target recipient address over a communications network; and wherein the instructions are further executable by the logic subsystem to identify the target recipient address from a database that associates the target recipient address with the seatback pocket for aircraft operations occurring between identifying the baseline condition for the seatback pocket and detecting the foreign object.

15. A detection system for monitoring an aircraft passenger cabin containing a plurality of seatback pockets, the detection system comprising:

a sensor subsystem including one or more sensors associated with each of the plurality of seatback pockets, wherein the one or more sensors associated with each seatback pocket of the plurality of seatback pockets includes an angle sensor that outputs an indication of an angle between an outer wall of the seatback pocket and its seatback;

a logic subsystem interfacing with the sensor subsystem; and a storage subsystem having instructions stored thereon executable by the logic subsystem to:

receive sensor data captured via the sensor subsystem;

identify, for each of the plurality of seatback pockets, a baseline condition in which foreign objects are absent from the seatback pocket;

detect a foreign object within a seatback pocket based on the sensor data captured by the one or more sensors associated with the seatback pocket and the baseline condition identified for the seatback pocket; and output an indication that the foreign object is within the seatback pocket, the indication identifying the seatback pocket among the plurality of seatback pockets.

16. The detection system of claim 15, wherein the instructions are further executable by the logic subsystem to:

detect a trigger condition responsive to receiving a user input via a service personnel interface or a sensor input via a sensor located on-board the aircraft;

responsive to the trigger condition, conduct an audit of the plurality of seatback pockets for contents; and wherein the indication that the foreign object is within the seatback pocket is output is based on the audit.

17. The detection system of claim 15, wherein the instructions are further executable by the logic subsystem to:

aggregate the sensor data received over time to obtain an aggregate value for each of the plurality of seatback pockets;

detect an aggregate fatigue condition for one of the plurality of seatback pockets based on the aggregate value for the seatback pocket; and output an indication of the aggregate fatigue condition that identifies the seatback pocket among the plurality of seatback pockets.

18. The detection system of claim 15, wherein the baseline condition includes sensor data received via the one or more sensors associated with the seatback pocket in which foreign objects are absent from the seatback pocket; and wherein the foreign object is identified within the seatback pocket based on a comparison of the baseline sensor data received for the baseline condition to the sensor data received by the one or more sensors associated with the seatback pocket.

19. The detection system of claim 15, wherein the indication that the foreign object is within the seatback pocket is output as a visual indication via a display device or an illumination unit integrated with the aircraft.

20. The detection system of claim 15, wherein the indication that the foreign object is within the seatback pocket is output by transmitting an electronic message identifying the seatback pocket to a target recipient address over a communications network; and wherein the instructions are further executable by the logic subsystem to identify the target recipient address from a database that associates the target recipient address with the seatback pocket for aircraft operations occurring between identifying the baseline condition for the seatback pocket and detecting the foreign object.

* * * * *